United States Patent [19]
Weigel et al.

[11] Patent Number: 6,029,799
[45] Date of Patent: Feb. 29, 2000

[54] METHOD FOR CONTROLLING DRIVES OF CONVEYING MACHINERY

[75] Inventors: Wilfried Weigel, Werne; Arno Breimhorst, Hagen; Jens Titschert, Lünen, all of Germany

[73] Assignee: DBT Automation GmbH, Germany

[21] Appl. No.: 09/111,579

[22] Filed: Jul. 8, 1998

[30] Foreign Application Priority Data

Aug. 19, 1997 [DE] Germany .......................... 197 35 941

[51] Int. Cl.[7] ................................................. B65G 47/00
[52] U.S. Cl. ..................................... 198/810.04; 198/813
[58] Field of Search ............................. 198/810.04, 813, 198/810.01, 718

[56] References Cited

U.S. PATENT DOCUMENTS

| | | | |
|---|---|---|---|
| 3,638,781 | 2/1972 | Comley | 198/810.04 |
| 3,712,457 | 1/1973 | Pelzer | 198/810.04 |
| 4,657,131 | 4/1987 | Brychta | 198/810.04 |
| 5,647,640 | 7/1997 | Heintzmann et al. | 198/810.04 |

FOREIGN PATENT DOCUMENTS

| | | | |
|---|---|---|---|
| 3841884 | 6/1990 | Germany . | |
| 27807 | 2/1982 | Japan | 198/813 |

*Primary Examiner*—William E. Terrell
*Assistant Examiner*—Khoi H. Tran
*Attorney, Agent, or Firm*—Bauer & Schaffer, LLP

[57] ABSTRACT

A method for controlling the main and auxiliary drives of conveyors, for example, in underground mining. The drives are controlled as a function of the loading of the conveyor in such a way that in a low load range of the conveyor the auxiliary drive produces a higher output ($20_1$) than the main drives and as the load increases the output advantage of the auxiliary drive in relation to the main drives is reduced. This special load distribution to auxiliary and main drives has the advantage that sagging of the conveyor element, for example the chain of a scraper chain conveyor in the inaccessible and concealed lower strand, close to the main drive, can be prevented. The risk of damage to the machine frame or conveyor chain is thereby reduced.

5 Claims, 2 Drawing Sheets

METHOD FOR CONTROLLING DRIVES OF CONVEYING MACHINERY

FIELD OF THE INVENTION

The invention relates to a method for controlling drives, in particular main drives and auxiliary drives, of conveying machinery. The method of the invention is especially, although not necessarily exclusively, useful in underground mining, particularly for controlling scraper chain conveyors as commonly used for conveying coal.

BACKGROUND OF INVENTION

Owing to their construction, the scraper chain conveyors used in underground coal mining are subject to "chain sag" involving a slackening of the chain in the region of the main drive and/or auxiliary drive after the chain has passed round the sprocket wheel. The sag is due partly to the fact that the conveyors are constructed in individual segments, which necessitates a certain amount of play in the chain, and partly to elongation of the chain during its operating life, and variations in the length of the conveyor itself.

At the auxiliary drive the sag occurs on the open, exposed upper side of the conveyor, where the untensioned slack portion of the chain is unconfined, so that sag in this region of the conveyor seldom causes any problems. At the main drive, however, sag occurs in the concealed lower part of the main drive machine frame, where clearances are limited, so that the slack may cause jamming and severe damage to the chain and/or to the machine frame.

In the conveyors normally used hitherto, the main and auxiliary drives are usually controlled so that they share the instantaneous conveying load in equal proportions. This distribution of the load ensures that when the conveyor is operating in the high load range, in which the tension in the active upper strand is distinctly higher than in the returning lower strand, the lower strand in the lower part of the machine frame is always tensioned, and sag can only occur at the auxiliary drive, in the visible upper part of the conveyor.

However, if the conveyor is running under no load or under low load, the tension required for the lower strand is greater than the tension required for the upper strand, since the lower strand is subject to increased friction due to small coal and dirt which accumulates in the lower part of the machine frame. The consequence is that, even with driving output symmetrically divided between the main and auxiliary drives, sag will occur first at the main drive, where it may be unnoticed and may quickly lead to severe damage to the conveyor. If the conveyor is provided with more main drives than auxiliary drives, and all drives receive the same output, the risk of sag at the main drives is even greater.

SUMMARY OF INVENTION

An object of the invention is to provide a method for controlling such conveying machinery by which chain sag at the main drive of conveyor machinery can reliably be avoided.

The invention proposes controlling the drives as a function of the loading of the conveyor in such a way that in the low load range of the conveyor a higher output is produced by the auxiliary drive(s) than the main drive(s) and, as the loading of the conveyor increases, the output advantage of the auxiliary drive(s) relative to the main drive(s) is reduced.

By means of the method according to the invention the critical situation of chain sag at the main drive can be reliably prevented or at least mitigated on any conveyor by virtue of the fact that in the low load range, where greater tension is required for the lower strand than for the upper, the auxiliary drive receives a higher output than all the main drives combined, thus ensuring that the auxiliary drive alone exerts the necessary tension on the lower strand and in so doing is not assisted by the main drive(s), which would otherwise result in chain sag at the main drive. Instead, the load distribution in the low load range is chosen so that the auxiliary drive carries a sufficiently large proportion of the total load to be able to exert, via the wrap of the chain at the main drive, part of the tension required for the upper strand. This ensures that chain sag (if it occurs at all) can only form at the auxiliary drive, that is to say on the exposed top side of the conveyor, where adequate room is available for the slack region of the chain, and no damage is caused to chain and/or conveyor.

As the loading of the conveyor increases, the output advantage of the auxiliary drive(s) over the main drive(s) is reduced, preferably in a continuous (eg. linear) manner, until, in a preferred configuration of the invention, the total driving output of the auxiliary and main drives is exerted in approximately equal proportions when the conveyor is operating under full load. If the conveyor is provided with one auxiliary drive and two main drives, the total driving output under full load can be delivered by the three drives in approximately equal proportions, whereas in the low load range the single auxiliary drive will then have a higher output than the two main drives combined.

In a preferred development of the method according to the invention, as the loading of the conveyor increases, the output supplied by the auxiliary drive is kept constant until the output of the main drive or of each main drive is equal to the output of the auxiliary drive, after which the driving output of all drives is increased uniformly as the loading continues to increase. In the reverse situation, as the loading of the conveyor is decreasing, the output of all drives is advantageously uniformly reduced until the output of the auxiliary drive(s) is still sufficient to pull, unassisted, the lower strand through the enclosed chain passage, at which point the output of the auxiliary drive is then held constant and the output of the main drives is reduced further to suit the loading of the conveyor.

Further features and advantages of the invention will be apparent from the following description, which describes in detail a preferred embodiment of the invention with reference to an example and the drawings.

DESCRIPTION OF THE EMBODIMENT

Figure 1:
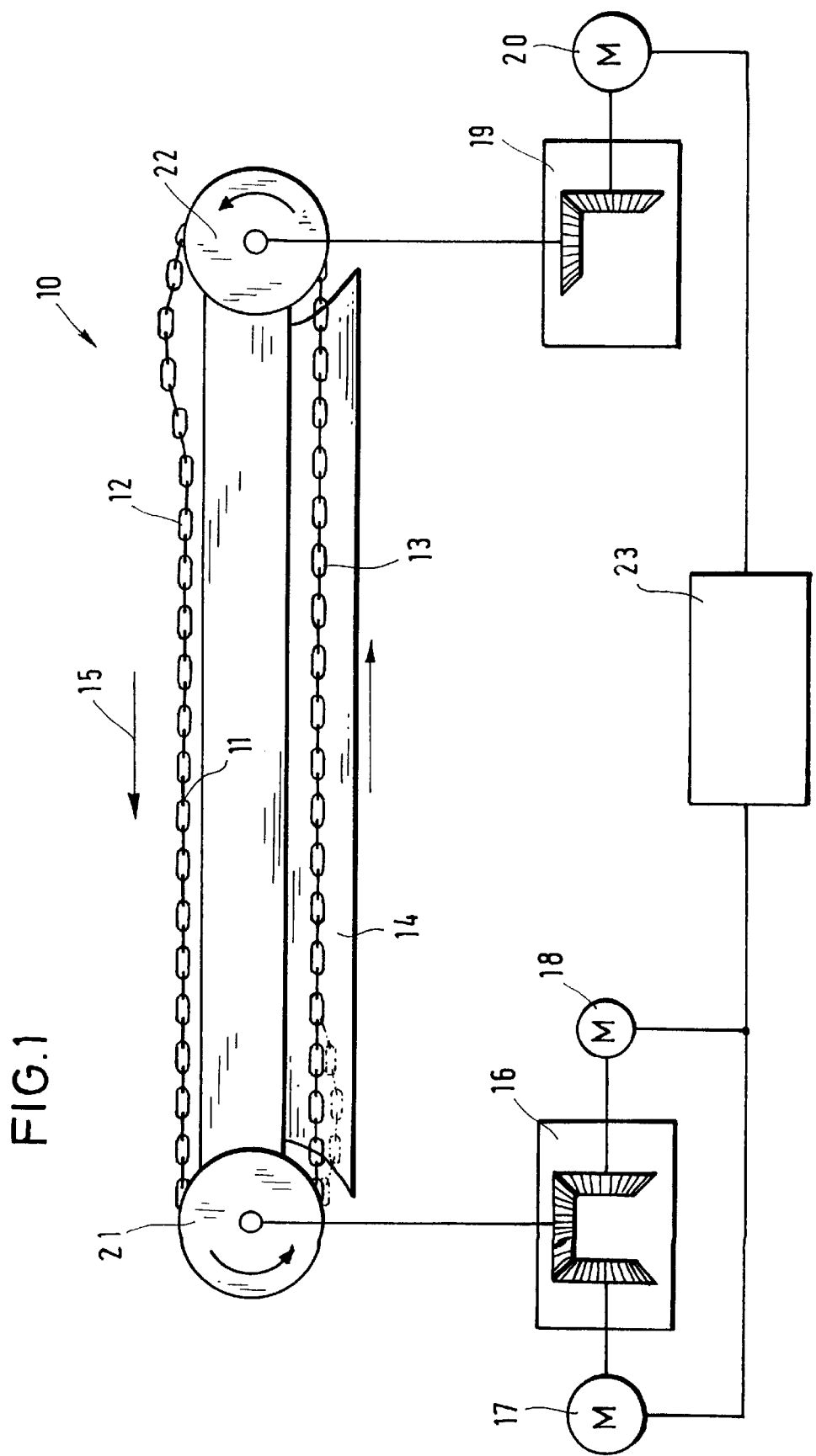
FIG. 1 is a diagrammatic illustration of a scraper chain conveyor which can be operated in accordance with the method of the invention.

FIG. 1 is a highly diagrammatic illustration showing a scraper chain conveyor 10 for an underground mining operation, with an endless chain 11 which is provided with scrapers (not shown). The upper strand 12 of the chain 11 runs inside an upwardly open conveyor trough assembled from a plurality of trough sections, whilst the lower strand 13 is led back through an enclosed passage 14 on the machine frame. Coal cut by a machine falls into the upwardly open trough of the scraper chain conveyor 10 and is transported in the direction of the arrow 15 by the scrapers on the upper strand 12.

The drive system of the conveyor 10 comprises a main drive station 16 with two main drive motors 17, 18 and an auxiliary drive station 19 with one auxiliary drive motor 20. The main drive station 16 drives a first chain sprocket 21 which directly sustains the load exerted by the upper strand 12 due to coal being conveyed, while the auxiliary drive station drives a second chain sprocket 22 which pulls the lower strand 13 of the chain through the passage 14.

Owing to their construction, scraper chain conveyors of the kind illustrated and described are subject to the risk of "chain sag" forming at the drives, as indicated for the upper strand immediately after the chain leaves the second sprocket at the auxiliary drive station and in chain-dotted lines—for the lower strand after it leaves the first sprocket at the main drive station. The sag is partly due to the fact that scraper chain conveyors are built up of a large number of separate segments which are movable in relation to one another for the shifting of the conveyor, and partly to the heavy loading of the conveyor chains, causing them to stretch in the course of time.

Sag due to insufficient tensioning or excessive slackness of the chain at the auxiliary drive seldom leads to any problems since in the upwardly open conveyor trough the sag can easily be seen and can therefore be constantly watched, and also because there is sufficient clearance for the chain in the conveyor trough, so that the individual chain links are able to shift unhindered. It is much more problematic when sag occurs at the main drive, as it is practically impossible to detect this visually and, because of the narrowness of the chain passage 14, the sag frequently leads to jamming and/or severe damage of the chain.

Figure 2:
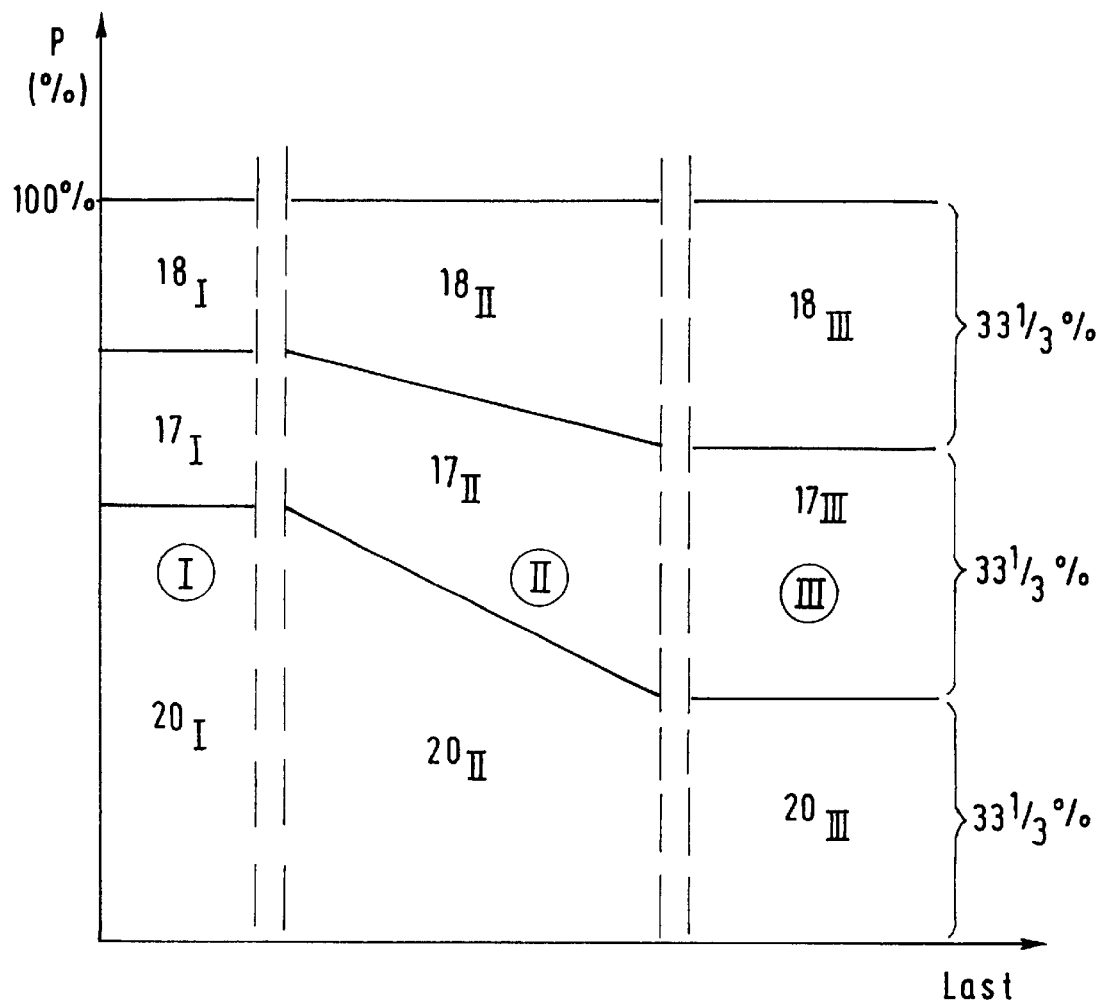
FIG. 2 is a diagram of the load distribution of the main and auxiliary drives of the conveyor shown in FIG. 1, when operated in accordance with the method.

In accordance with an embodiment of the invention, to prevent sag at the main drive 16, the drive motors 17, 18 and 20 of the conveyor 10 are controlled as a function of the loading of the conveyor, as illustrated in the diagram in FIG. 2.

In the low load range I of the conveyor the auxiliary drive 20 produces a percentage $20_I$ of the total load which is at least equal to, and in fact somewhat higher than, the two main drives 17, 18 combined. In FIG. 2 the share $20_I$ of the auxiliary drive motor 20 in the loading is almost 60% of the total output to be delivered by all motors, while the shares $17_I$, $18_I$ of the main drives 17, 18 each represent only about 20% of the total output. In the low load range I, in which the upper strand 12 of the chain 11 is carrying little or no coal, and in which the tension required for the lower strand 13 is higher than the tension which has to be applied to the upper strand (because of the higher friction due to small coal and dirt in the passage 14), the greater part of the output to be produced is thus assumed by the auxiliary drive, ensuring that the lower strand 13 of the chain is kept tensioned over its entire length and sag cannot develop close to the main drive in the concealed part of the conveyor in the passage 14.

With increasing loading of the conveyor under increased coal load, the output of the main drive motors 17, 18 is continuously raised in a moderate load range II, thus reducing the output advantage of the auxiliary drive in relation to the main drive motors. At the same time, the total output is still distributed to the individual motors in such a way that the auxiliary drive motor not only produces the force needed to pull the lower strand 13, but also assists in the pulling of the upper strand 12 via the wrap of the chain around the first sprocket wheel 21. This ensures that the lower strand 13 running in the passage 14 is always tensioned over its entire length. In the high load range III the entire conveyor load is then distributed equally to all three drives 17, 18 and 20, with the auxiliary drive again not only serving to transport the chain back through the chain passage 14 but also contributing to the actual conveying effort.

The load distribution between main and auxiliary drives may be performed automatically with the aid of a computer 23 which controls and/or regulates the individual motors 17, 18 and 20.

The control and/or regulation is preferably always arranged so that, although the auxiliary drive makes at least a small contribution to the pulling of the upper strand via the wrap of the chain around the first sprocket wheel 21, conversely the main drive (or the main drive motors), particularly in the low load range, never produce a sufficiently high output to allow sag to occur in the lower strand close to the main drive.

The invention is not limited to the example which has been illustrated and described, and a large number of modifications and developments are possible without departing from the spirit and scope of the invention. For example, it is also possible to equip the auxiliary drive station with two or more auxiliary drive motors, which together, in the low load range I, provide more than half of the total output to be supplied, and, in the high load range III, produce an equal share in the total load to the main drives (of which there may be one, two or more), in the case where there are two main drives and two auxiliary drives, a share of about 25%.

We claim:

1. A method for controlling drives of conveying machinery having at least one main drive and at least one auxiliary drive, wherein said main and auxiliary drives are controlled as a function of loading of said conveying machinery, in a low load range of said conveying machinery said drives being controlled so that said auxiliary drive(s) produce(s) a higher output than said main drive(s), whereby said auxiliary drive(s) has/have an output advantage over said main drive(s), and as said loading of the conveying machinery increases said output advantage of said auxiliary drive(s) over said main drive(s) is reduced.

2. A method according to claim 1, wherein as said loading of the conveying machinery increases said output advantage of the auxiliary drive(s) is reduced continuously.

3. A method according to claim 1, wherein in full load operation of the conveying machinery a total output of said drives is produced in approximately equal proportions by said auxiliary and main drives.

4. A method according to claim 1 for controlling conveying machinery having one auxiliary drive and two said main drives, wherein said three drives produce the total drive output in full load operation in approximately equal proportions and in said low load range said auxiliary drive produces a higher output than said two main drives combined.

5. A method according to claim 1, wherein with said increasing loading of the conveying machinery the output produced by the or each auxiliary drive is initially kept constant until the output produced by the or each main drive is as high as the auxiliary drive output and thereafter with said loading increasing further the driving output of all drives is increased uniformly.

* * * * *